Oct. 27, 1953  J. FAVRE  2,656,816
REEL END ALARM
Filed May 31, 1951  2 Sheets-Sheet 1

INVENTOR
Jules Favre.

BY

ATTORNEY

Oct. 27, 1953  J. FAVRE  2,656,816
REEL END ALARM
Filed May 31, 1951  2 Sheets-Sheet 2

INVENTOR
Jules Favre.

BY

ATTORNEY

UNITED STATES PATENT OFFICE 2,656,816

REEL END ALARM

Jules Favre, Neuchatel, Switzerland, assignor to Paillard S. A., Sainte-Croix, Switzerland, a company of Switzerland Application May 31, 1951, Serial No. 229,038
In Switzerland June 5, 1950

5 Claims. (Cl. 116—67)

It is of current use to control the unwinding of a film in a cinematographic camera by means of a counter generally formed by a graduated disc or drum.

These counters permit, at any instant, of controlling either the length of the printed film or the length of the virgin film in reserve in the camera. However, these counters require constant attention of the careful operator so as to use the film completely without, however, effecting useless exposures, either on the endpart of the film, or after the complete passage of the film past the objective of the camera.

For obviating this disadvantage, some manufacturers have suggested placing the disc or drum of the counter in the interior of the view-finder so that it is visible during photographing. Others have suggested causing a pointer to appear in the view-finder at an opportune moment. These constructions for some types of camera have the disadvantage of having to be entirely lightproof. Sometimes they enter the useful field of the view-finder and are a source of undesirable distraction to the operator who must concentrate entirely on photographing.

The present invention has for its object to eliminate the above mentioned disadvantages. It relates to a metric and acoustic counter for a cinemotagraphic photographic camera, characterised in that means are provided for emitting an acoustic signal at the latest when the whole length of the film has been used.

One form of construction of the subject of the invention is shown by way of example in the accompanying drawing, wherein.

Figure 1:
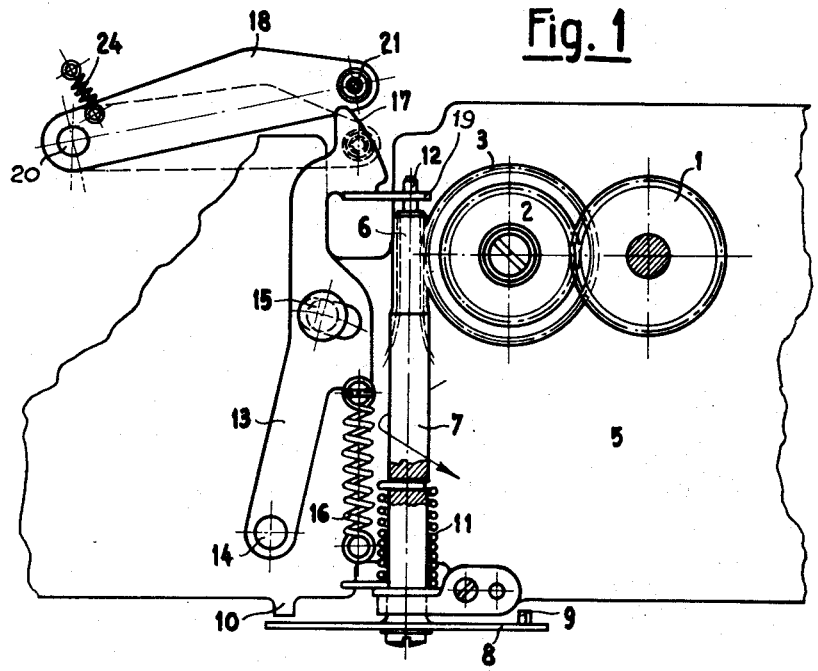
Fig. 1 is a view in elevation.
Figure 2:
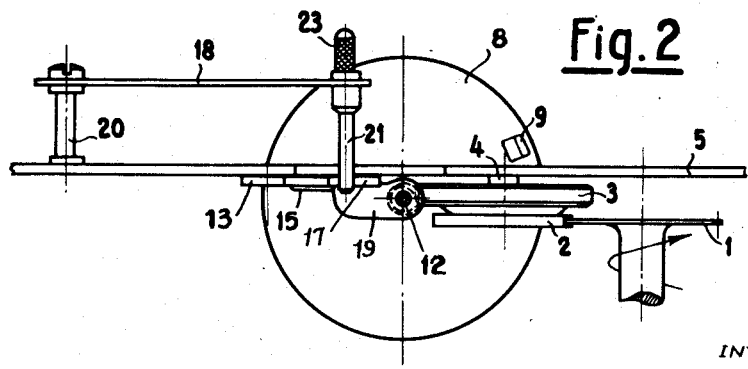
Fig. 2 is a view in plan of the subject of the invention.

The mechanism for moving the film, not shown in the drawing sets in rotation a toothed wheel 1 which gears with a toothed wheel 2 secured to a worm 3. The wheel 2 and the worm 3 are pivoted on a spindle 4 riveted to the plate 5.

The worm 3 gears with a worm wheel 6 secured to a shaft 7 of which one end carries a visible counting indicator, formed by a disc 8 provided with graduations adapted to indicate the length of film used. A stop or lug 9 provided on the said disc, limits its rotation to one revolution and thus that of the shaft 7, by striking against one side or the other of a projection or lug 10 on the plate 5. A coiled spring 11, operating under torsion, is secured at one of its ends to the shaft 7 and at its other to the plate 5.

An end 12 of shaft 7 passes through a bearing provided in a bent portion 19 of lever 13. This lever is fulcrumed on a pin 14 fixed to plate 5 and subjected to the action of a spring 16 which tends to turn it clockwise around pin 14 and consequently urges the worm wheel 6 toward the worm 3. A headed pin 15 is fixed to plate 5 and passes through an elongated opening of lever 13 to prevent the latter from separating from plate 5.

The operation of the counter is as follows: During feeding of the film worm 3 drives the graduated disc 8 through the medium of the shaft 7 and the worm wheel 6, until the moment at which the stop 9 strikes against the projection 10. During this movement the shaft 7 stretches the spring 11. The gear ratio between the mechanism and the disc 8 of the counter is so determined that the disc indicates the complete passage of the film at the moment at which it is stopped by the projection 10. The stopping of the graduated disc 8 automatically sets into operation the acoustic signal which warns the operator either that the charged film has been used completely or that a short length of film remains available. In fact, the stopping of the disc also produces the stopping of the shaft 7 and its worm wheel 6. As the worm 3, driven by the mechanism, continues to turn, it pushes the worm 3, thereby causing rotation of element 13 around pin 14 and against the action of spring 16 until the teeth of the worm wheel 6 rise on those of the worm 3. At this moment, the spring 11, tensioned, causes the shaft 7 to turn through a slight amount, whilst the spring 16 returns suddenly, through the medium of the part 13, the worm wheel 6 into gearing position on the worm 3. The sudden return causes an impact between worm 6 and worm wheel 3 so that a perceptible noise is made, movement being reproduced periodically.

Figure 3:
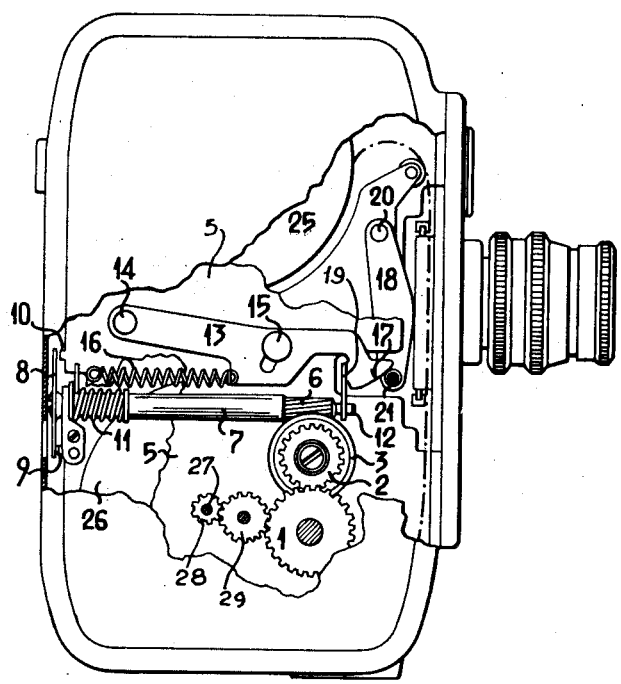
Fig. 3 is a lateral view of a camera, parts of which are omitted to show the counting mechanism.

In Figure 3 the path traced by the film coming from the delivering reel 25 and wound on the reel 26 is illustrated in dotted lines. The drive of reel 26 is effected in a conventional manner by a shaft 27 and a friction coupling not shown. The shaft 27 is driven by the mechanism advancing the film and carries a pinion 28. Shaft 27 rotates worm 3 by means of gearing 28, 29, 1 and 2. Gear 2 and worm 3 are pivoted on an axle 4 fixed to a plate 5 being part of a frame.

For setting to zero automatically, the movement of the part 13 towards the left, produces the disengagement of the worm wheel 6 and the worm 3. The spring 11 expands and moves with it the shaft 7 and the graduated disc 8, until the moment at which the stop 9 is stopped by the projection 10. The counter again indicates zero and is ready to operate when the part 13 is lowered and allows of the engagement of the worm wheel 6 and the worm 3. The movement of the part 13 is effected by means of a lever 18 pivoted on a column 20 riveted to the other side of the plate 5. The lever 18 carries a finger 21 so arranged as to co-operate with the ramp 17 of the part 13, during its movement for setting it to zero in the position shown in broken lines. The lever 18 is operated manually by a milled knob 23 and is returned to its initial position by the spring 24.

It will be clear that for setting to zero, the movement of the part 13 may be effected directly, without the intermediary of the pivoted lever 18. Further, the actuation of this part may be effected by one of the operations necessary for changing the film, for example by opening the cover, the withdrawal of the feeding claw or the opening of the pressure plate.

The worm 3 may also be driven directly by a shaft of the mechanism, without the intermediary of the two toothed wheels 1 and 2. It may, for example, be secured to the spring case.

Further, provision may be made for the acoustic signal to be produced at the beginning of the endpart of the film, which may be obtained by so selecting the ratio of transmission between the mechanism and the graduated disc 8 that the stop 9 strikes against the projection 10 at the commencement of the end-part of the film. A predetermined number of taps then indicates the passage of this portion.

In a modification, the graduated device 8 need not be secured directly to the end of the shaft and to provide at this point a reduction device by gearing or by a belt. The spring 11 may then be mounted, for example, on the new shaft of the graduated disc.

I claim:

1. A mechanism for visually indicating the length of a film wound and audibly signaling a predetermined length thereof comprising a frame, a reel in the frame for delivering the film, a second reel in the frame for winding the delivered film, a first gear journaled in the frame and driven by the second reel, a second gear meshing with the first gear and including a shaft, a spring urging the shaft to a certain position of rotation, means journaling one end of the second gear shaft and pivoted to the frame, a second means pivoted to the frame and journaling the other end of the second gear shaft, a second spring urging the second journaling means to a position meshing the two gears, an indicator disc fixed to the second gear shaft and including a lug, a stationary lug fixed to the frame and engageable by the disc lug and thereby holding the shaft and gear against rotation in one direction, the second gear thus held against rotation being radially displaced by the first gear to unmeshing position and moving the second means for journaling the second gear shaft against the force of the second spring whereby both springs urge the second gear to a position meshing with the first gear and the noise of impact of both gears signals that a predetermined film length has been wound, and manually operable means engaging the second journaling means and disengaging the second gear from the first gear.

2. The mechanism according to claim 1 and wherein the first gear is a worm and the second gear is a worm wheel.

3. The mechanism according to claim 1 and wherein the second journaling means is a lever fulcrumed to the frame.

4. The mechanism according to claim 1 and wherein the last mentioned means is a lever fulcrumed to the frame and the second journaling means has a ramp engaged by said lever.

5. In a camera including a casing, an inner frame, and film feeding and film winding reels mounted in said frame, the combination including, means for visually indicating the length of film wound and audibly signaling a predetermined length thereof, said means comprising, a train of gearing connected with the winding reel and including a worm, a shaft having a pinion, spring controlled means for mounting said shaft for movement to cause said pinion to engage and disengage said worm, an indicator disk mounted on one end of the shaft for visual observation, cooperating means on the frame and disk for abutting engagement to establish the zero position of the disk, a spring surrounding the shaft and having its ends anchored to urge the shaft in an angular direction to normally zero position against the effect of the shaft being turned by the train of gearing to show the length of film used and means for releasing the spring controlled means to reset the disk to zero.

JULES FAVRE.

References Cited in the file of this patent

UNITED STATES PATENTS

| Number | Name | Date |
| --- | --- | --- |
| 407,590 | Hall | July 23, 1889 |
| 1,208,646 | Power | Dec. 12, 1916 |
| 1,841,748 | Marks | Jan. 19, 1932 |